(12) United States Patent
Rizet et al.

(10) Patent No.: US 8,384,246 B2
(45) Date of Patent: Feb. 26, 2013

(54) CONVERTER DEVICE AND UNINTERRUPTIBLE POWER SUPPLY EQUIPPED WITH SUCH A DEVICE

(75) Inventors: Corentin Rizet, Francin (FR); Alain Lacarnoy, Saint Nazaire les Eymes (FR); Jean-Paul Ferrieux, Meylan (FR)

(73) Assignee: MGE UPS Systems, Montbonnot Saint-Martin (FR)

( * ) Notice: Subject to any disclaimer, the term of this patent is extended or adjusted under 35 U.S.C. 154(b) by 0 days.

(21) Appl. No.: 12/737,802

(22) PCT Filed: Aug. 10, 2009

(86) PCT No.: PCT/FR2009/000996
§ 371 (c)(1),
(2), (4) Date: Feb. 17, 2011

(87) PCT Pub. No.: WO2010/029222
PCT Pub. Date: Mar. 18, 2010

(65) Prior Publication Data
US 2011/0133554 A1 Jun. 9, 2011

(30) Foreign Application Priority Data
Sep. 12, 2008 (FR) .................................... 08 05013

(51) Int. Cl.
*H02J 3/00* (2006.01)
(52) U.S. Cl. .......................................... 307/82; 363/16
(58) Field of Classification Search .................. 307/151, 307/66, 64, 82; 363/13, 15, 16, 59, 21.01
See application file for complete search history.

(56) References Cited

U.S. PATENT DOCUMENTS

| 5,841,268 | A | 11/1998 | Mednik | 323/222 |
| 7,283,379 | B2 * | 10/2007 | Baker et al. | 363/98 |
| 2005/0041440 | A1 | 2/2005 | Natori | 363/21.01 |
| 2006/0176719 | A1 | 8/2006 | Uruno et al. | 363/89 |
| 2011/0193412 | A1 * | 8/2011 | Lacarnoy | 307/75 |
| 2011/0260543 | A1 * | 10/2011 | Rizet | 307/66 |

FOREIGN PATENT DOCUMENTS
EP 966092 A1 * 12/1999
JP 2005-245127 9/2005

* cited by examiner

*Primary Examiner* — Daniel Cavallari
(74) *Attorney, Agent, or Firm* — Steptoe & Johnson LLP

(57) ABSTRACT

A converter device comprising a power supply input, rectifier means, switching means, control means, and a switching aid circuit, said switching aid circuit comprising inductive means, branch-off means of an input current, and power storage means. The device of the invention is characterized in that the inductive means are essentially formed by a transformer directly connected to the power supply input and comprising reverse-coiled windings, and that the branch-off means comprise auxiliary switching means directly connected between said inductive means and a voltage reference or an output line to establish branch-off of the input current onto said inductive means before main turn-on.

An uninterruptible power supply comprising the converter device described above.

11 Claims, 8 Drawing Sheets

CONVERTER DEVICE AND UNINTERRUPTIBLE POWER SUPPLY EQUIPPED WITH SUCH A DEVICE

This application is a national stage entry of International Application No. PCT/FR2009/000996, filed Aug. 10, 2009 designating the U.S., which claims the benefit of French Application No. 08/05013, filed Sep. 12, 2008.

BACKGROUND OF THE INVENTION

The invention relates to the field of converters such as inverters, for example those used in uninterruptible power supplies, in particular in high-power uninterruptible power supplies, i.e. with a power generally comprised between about 100 and 500 kVA.

The invention more particularly concerns a unidirectional converter device designed to supply a substantially DC output voltage on an output line, said device being equipped with at least one switching unit comprising:
- a power supply input on which a generally variable input voltage is applied,
- rectifier means connected to said power supply input to supply the output voltage,
- switching means connected to said power supply input to obtain main turn-on or main turn-off of an input current so that, when main turn-off occurs, said input current is diverted to said rectifier means,
- control means of said switching means, and
- a switching aid circuit arranged between the power supply input and the output line to establish a switching voltage substantially equal to zero, before main turn-on, said switching aid circuit comprising inductive means, input current branch-off means, and power storage means parallel-connected on the switching means to establish a resonance of said current in the inductive means before main turn-on.

STATE OF THE ART

Uninterruptible power supplies are commonly developed to improve their efficiency and to reduce noise annoyance generated by switching frequencies that are often low, around a few thousand hertz. In this context, it has been shown that it was interesting to use uninterruptible power supplies presenting topologies on several levels, generally three levels, using components with enhanced performances so as to improve solutions to the problems set out above.

Figure 1:
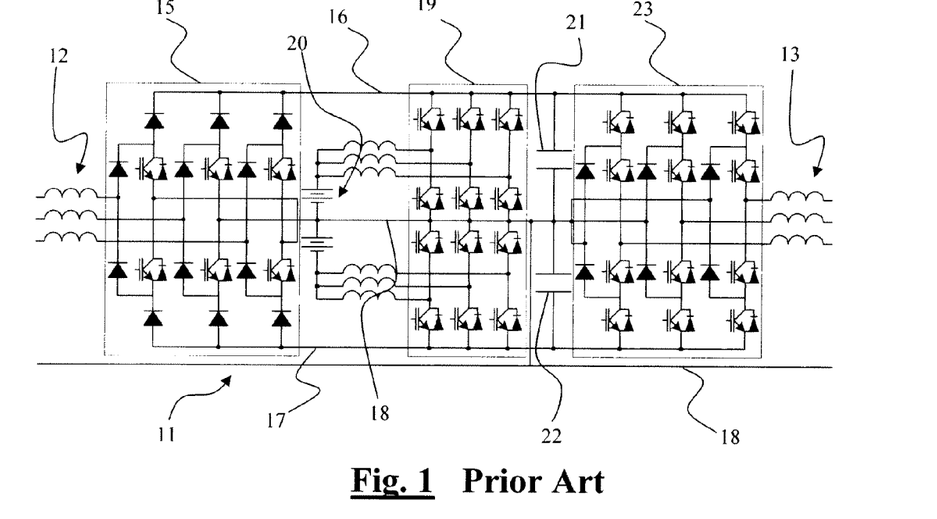
FIG. 1 represents an uninterruptible power supply according to the prior art.

With reference to FIG. 1, one such uninterruptible power supply 11 comprises a mains system input 12 on which an electric mains power supply is connected and which enables a variable input voltage, most commonly an AC voltage, to be applied to said uninterruptible power supply 11. The uninterruptible power supply also comprises a mains system output 13 on which loads are connected and which provides an electric power supply called backed-up supply, i.e. an electric power supply for which the voltage and frequency are controlled. The uninterruptible power supply 11 comprises a rectifier or an AC/DC converter 15 connected to the mains system input 12, substantially DC voltage lines 16, 17, and a voltage reference 18 connected on output of the rectifier. The uninterruptible power supply 11 also comprises a DC/DC converter 19 comprising electric power storage means 20, said converter and said storage means being connected on the substantially DC voltage lines 16, 17. The uninterruptible power supply 11 further comprises decoupling capacitors 21, 22 connected between the voltage reference 18 and the substantially DC voltage lines 16, 17, and a reversible inverter or DC/AC converter 23 connected between said lines 16, 17 and the mains system output 13.

Figure 2:
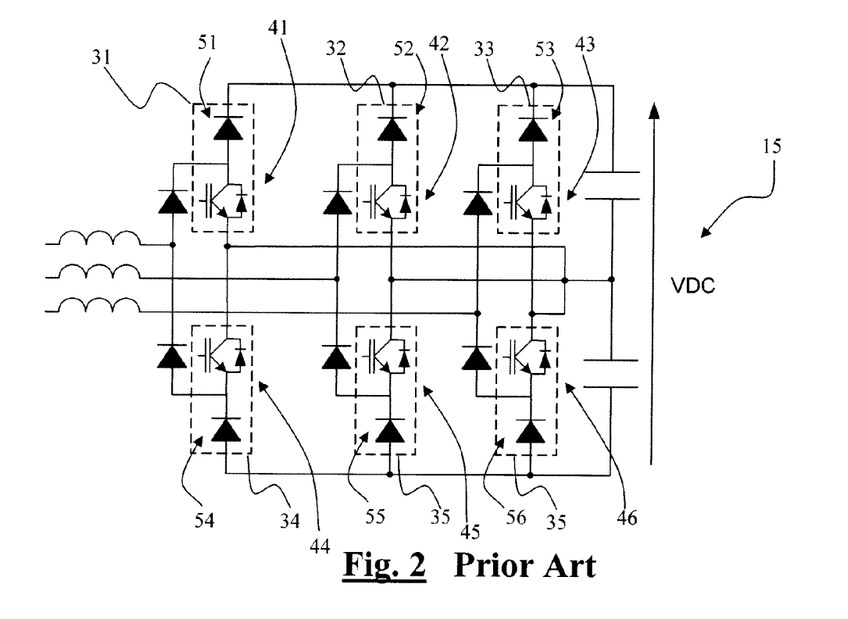
FIG. 2 represents the rectifier of the uninterruptible power supply represented in FIG. 1.

The rectifier 15 of the uninterruptible power supply 11 represented in FIG. 2 comprises six switching circuits 31 to 36. More precisely, the rectifier 15 comprises two switching circuits for each of the three phases, one dedicated to positive half-waves and the other dedicated to negative half-waves. The rectifier 15 is furthermore of unidirectional type, i.e. it is not reversible and only enables AC/DC conversion to be performed. To achieve this AC/DC conversion, the rectifier 15 comprises transistors 41 to 46 and diodes 51 to 56.

As can be seen in FIGS. 1 and 2, the uninterruptible power supply 11 presents a topology on three levels, i.e. the rectifier 15 supplies a substantially DC voltage on three levels, i.e. a positive level on line 16, a negative level on line 17 and a zero level on voltage reference 18. The positive and negative levels generally present the same electric potential in absolute value substantially equal to half the voltage VDC between lines 16 and 17.

When the uninterruptible power supply 11 represented in FIG. 1 is used, and in particular the rectifier device 15 in its AC/DC converter function, the switching speeds of the transistors 41 to 46 and the high currents flowing therein impose very great structural constraints. Furthermore, the switching losses in these active power electronic components limit the increase of the switching frequency.

One solution to remedy these drawbacks is to use switching aid circuits in each switching circuit to obtain soft switchings, i.e. to reduce switching losses and to control the current variations. Such switching aid circuits are used in the rectifier device 111 partially represented in FIG. 3. In the device represented in FIG. 3, only two switching circuits are represented associated with one of the three phases. It is to be noted that the circuit rectifier 111 is not reversible and can therefore only be used for performing an AC/DC conversion.

Figure 3:
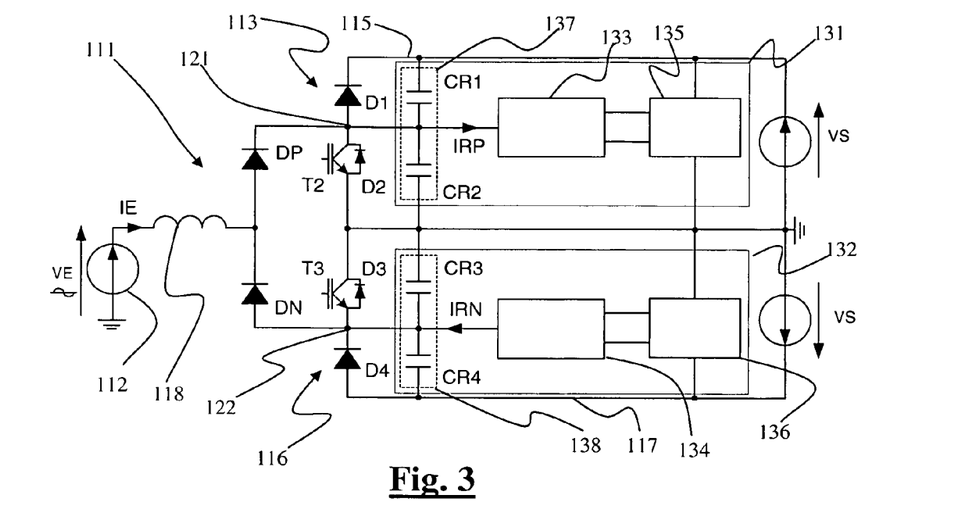
FIG. 3 partially represents a rectifier device with a switching aid circuit according to the prior art.

More precisely, with reference to FIG. 3, the rectifier device 111 comprises a voltage source 112 delivering an AC voltage, a first switching circuit 113 enabling a substantially constant voltage having a positive value to be supplied on an output line 115 and a second switching circuit 116 enabling a substantially constant voltage having a negative value to be supplied on an output line 117. A first branch of the rectifier device 111 comprising a diode DP supplies the first switching circuit 113 for the positive half-waves of the input voltage. In the same way, a second branch of the rectifier device 111 comprising a diode DN supplies the second switching circuit 116 for the negative half-waves of the input voltage. Between the voltage source and the above-mentioned two branches, an inductance 118 performs impedance matching on the scale of the switching period. Each switching circuit 113, 116 comprises a power supply input 121, 122 to which an input current IE is input. Rectifier means, in this instance diodes D1, D4, connected to their respective supply inputs 121, 122 supply an output voltage VS switching successively from an off state to an on state. Each switching circuit 113, 116 comprises switching means, i.e. main transistors T2, T3, connected to their respective supply inputs 121, 122 and enabling a change of state to be obtained, i.e. a main turn-on or a main turn-off of the input current. When main turn-on takes place, the input current IE flows in the main transistor. When main turn-off takes place, this input current IE is diverted to the rectifier means. The diode DP, rectifier means D1 and switching means T2 form a topology often referred to as boost topology. The same is the case for the diode DN, rectifier means D4 and switching means T3. The topology represented in FIG. 3 is thus often referred to as double boost. However, the invention can also apply to a topology often referred to as step-down structure.

As can be seen in FIG. 3, the rectifier device is equipped with switching aid circuits 131, 132, the circuit 131 being arranged between the power supply input 121 and the output line 115, the circuit 132 for its part being arranged between the power supply input 122 and the output line 117. The main function of these switching aid circuits is to reduce switching losses in the power transistors T2 and T3 by limiting, or even cancelling, the current or voltage in said transistors T2 and T3 when changes of state take place. In particular, these switching aid circuits enable main turn-on of the switching means T2 and T3 to be obtained with zero voltage. This switching mode qualified as Zero Voltage Switching is often abbreviated to "ZVS". The switching aid circuits 131, 132 comprise inductive means respectively referenced 133, 134 and respectively connected to the power supply inputs 121, 122. In the prior art, the inductive means generally comprise at least one inductance which is often directly connected to the power supply input. The switching aid circuits 131, 132 also comprise branching means of the input current IE, respectively referenced 135, 136 and connected to said inductive means to establish branch-off of the input current in said inductive means before main turn-on. The switching aid circuits 131, 132 further comprise power storage means respectively referenced 137, 138 parallel-connected on the switching means to establish a resonance of the input current IE in the inductive means before main turn-on. More precisely, these power storage means 137 comprise a capacitor CR1 parallel-connected with the diode D1 and a capacitor CR2 parallel-connected with the transistor T2. In the same way, power storage means 138 comprise a capacitor CR4 parallel-connected with the diode D4 and a capacitor CR3 parallel-connected with the transistor T3.

The rectifier device represented in FIG. 3 operates in the following manner. Before turning the switching means T2, T3 on, the input current IE is deviated via the branch-off means 135, 136. The current intensity IRP, RN flowing in the inductive means 133, 134 increases at the same time as the current flowing in the rectifier means D1, D4 decreases. When the current IRP, IRN in the inductive means 133, 134 reaches the value of the input current IE, the rectifier means D1, D4 turn off. A current resonance phase is then obtained between the inductive means 133, 134 and the power storage means 137, 138. This resonance phase enables the voltage V2, V3 at the terminals of the switching means T2, T3 to be cancelled. It is then possible to turn these switching means T2, T3 on with a switching voltage substantially equal to zero. Throughout this phase, a magnetization is created in the inductive means, i.e. the value of the magnetic field increases.

The switching aid circuits of converter devices of the prior art generally do not enable complete demagnetization of the inductive means to be obtained before main turn-off of the switching means. In addition, they comprise electronic power components, in particular transistors, the rating and quantity of dissipated energy of which are not optimized.

SUMMARY OF THE INVENTION

The object of invention is to remedy the drawbacks of converter devices of the prior art by proposing a unidirectional converter device designed to supply a substantially DC output voltage on an output line, said device being equipped with at least one switching unit comprising:

a power supply input on which the input voltage is applied, rectifier means connected to said power supply input to supply the output voltage, switching means directly connected to said power supply input to obtain a main turn-on or a main turn-off of an input current so that, when main turn-off occurs, said input current is diverted to said rectifier means, control means of said switching means, and a switching aid circuit arranged between the power supply input and the output line to establish a switching voltage substantially equal to zero, before main turn-on, said switching aid circuit comprising inductive means, input current branch-off means to establish branch-off of the input current onto said inductive means before main turn-on, and power storage means parallel-connected on the switching means to establish a resonance of said current in the inductive means before main turn-on.

The converter device according to the invention is characterized in that the inductive means are essentially formed by a transformer directly connected to the power supply input and comprising reverse-coiled windings, and that the branch-off means comprise auxiliary switching means directly connected between said inductive means and a voltage reference or between said inductive means and the output line.

The transformer preferably comprises:

a first winding connected between the power supply input and the branch-off means, and a second winding magnetically coupled to the first winding and connected between said power supply input and the output line or between the power supply input and the voltage reference.

The transformer preferably presents a transformation ratio of less than one.

Advantageously, a first reverse-blocking diode is connected between the first winding and the output line or between the first winding and the voltage reference. Preferably a second reverse-blocking diode is connected between the second winding and the output line or between the second winding and a voltage reference.

Advantageously, the auxiliary switching means are essentially formed by an auxiliary transistor connected directly between the first winding and the voltage reference or between the first winding and the output line, said auxiliary transistor supplying on the transformer windings a voltage having a value that is a function of the output voltage, on main turn-off and at the moment turn-on of said auxiliary transistor takes place.

According to one embodiment, the control means comprise a time delay module designed to force a delayed main turn-on after a period longer than a predefined period. The control means are preferably applied to the auxiliary switching means and comprise a module designed to trigger current branch-off during a longer period than the predefined period.

The rectifier means preferably comprise a diode comprising a current input, said input being connected to the power supply input.

Advantageously, the power storage means comprise a first capacitor parallel-connected with the rectifier means and a second capacitor parallel-connected with the switching means.

The invention also relates to an uninterruptible power supply comprising a power supply input on which a variable input voltage is applied, a rectifier connected to said input, at least one substantially DC voltage line connected on output of the rectifier, an inverter connected to said voltage line and comprising an output designed to supply a variable output voltage, characterized in that the rectifier is a converter device according to one of the foregoing claims and supplies a substantially DC output voltage on said line.

BRIEF DESCRIPTION OF THE DRAWINGS

Other advantages and features will become more clearly apparent from the following description of particular embodiments of the invention, given for non-restrictive example purposes only and represented in the appended drawings.

DETAILED DESCRIPTION OF AN EMBODIMENT

Figure 4:
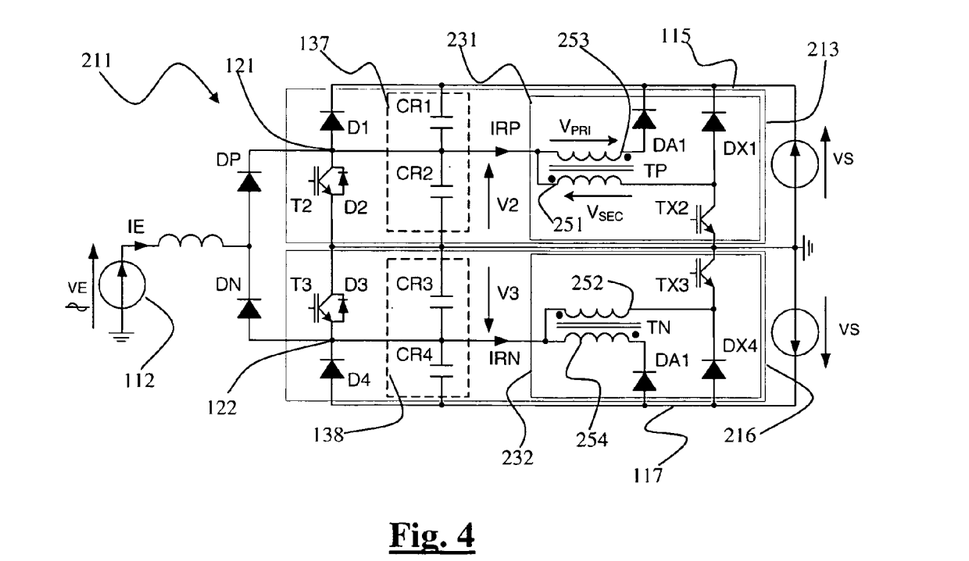
FIG. 4 partially represents a converter device according to a first embodiment of the invention.

The converter device 211 partially represented in FIG. 4 is a rectifier device comprising elements already described in the foregoing and indicated by the same reference numbers. As for FIG. 3, only the two switching circuits associated with one of the three phases have been represented. The converter device 211 comprises a voltage source 112 delivering an AC voltage VE and an input current IE. As in the case represented in FIG. 3, a first switching circuit 213 supplies a substantially constant voltage having a positive value on the output line 115. Likewise, a second switching circuit 216 supplies a substantially constant voltage having a negative value on an output line 117. As for FIG. 3, these switching circuits are of step-up type. Each switching circuit 213, 216 comprises a power supply input 121, 122 on which the input voltage VE is applied and in which the input current IE is input. The input voltage VE is variable, generally AC and often sinusoidal. The diode DP, rectifier means D1 and switching means T2 form a first structure of step-up type. The same is the case for the diode DN, rectifier means D4 and switching means T3 which form a second structure of step-up type. Each main transistor T2, T3 of the switching means generally comprises a diode D2, D3 parallel-connected and oriented in reverse direction with respect to the direction of the current flow in the transistor. The converter device 211 is equipped with switching aid circuits 231, 232, the circuit 231 being arranged between the power supply input 121 and the output line 115, the circuit 232 being arranged between the power supply input 122 and the output line 117.

In the embodiment represented in FIG. 4, the components referenced DP and DN are diodes. In other embodiments, these components can be thyristors.

With reference to FIG. 4, each switching aid circuit 231, 232 comprises inductive means essentially formed by a transformer TP, TN. Each transformer TP, TN is directly connected to the power supply input 121, 122 of the switching circuit considered. In other words, the two windings of the transformer are directly connected to the power supply input. On account of the fact that the inductive means of each switching aid circuit are essentially formed by a transformer, and that the latter is directly connected to the power supply input 121, 122, the topology of the converter device 211 and of its switching aid circuits 231, 232 is simplified.

Each switching aid circuit 231, 232 represented in FIG. 4 also comprises branch-off means of the input current IE comprising auxiliary switching means, i.e. an auxiliary transistor TX2, TX3. Each auxiliary transistor is connected to the transformer TP, TN to establish branch-off of the input current IE in said transformer before main turn-on. More precisely each auxiliary transistor TX2, TX3 is directly connected between the transformer TP, TN and the voltage reference. What is meant by directly connected is that the connection means between the auxiliary transistor and the voltage reference, and between this same auxiliary transistor and the transformer, are essentially formed by electric conductors or/and equivalent resistances of these conductors.

Each switching aid circuit 231, 232 represented in FIG. 4 further comprises power storage means 137, 138 parallel-connected on the switching means, i.e. on each transistor T2, T3, and on the rectifier means, i.e. diodes D1, D4. More precisely, the power storage means 137 comprise a capacitor CR1 parallel-connected with the diode D1 and a capacitor CR2 parallel-connected with the main transistor T2. In the same way, the power storage means 138 comprise a capacitor CR4 parallel-connected with the diode D4 and a capacitor CR3 parallel-connected with the transistor T3. These storage means, among other things, enable a current resonance to be established in the transformers TP, TN before main turn-on.

As represented in FIG. 4, the transformer TP, TN of each switching circuit 231, 232 comprises a first winding 251, 252 connected between the power supply input 121, 122 and the auxiliary switching means TX2, TX3. This transformer TP, TN also comprises a second winding 253, 254 magnetically coupled to the first winding 251, 252 and connected between this same power supply input 121, 122 and the output line 115, 117, more precisely between the power supply input 121, 122 and the diode DA1, DA4. Furthermore, the second winding 253, 254 is reverse-coiled with respect to the first winding 251, 252.

This configuration of the transformer TP, TN enables more current to be diverted into each of the windings of the transformer TP, TN when the auxiliary transistors TX2, TX3 are turned-on. Due to the reverse-coiling of the windings and to connection of the contiguous ends of said windings to the power supply input, the input current IE is in fact diverted to be shared in each of the windings. The input current IRP, IRN is thereby amplified by mutual induction. This enables the current rating of the auxiliary transistor TX1, TX2 to be reduced. After turn-off of the diode D1, D4, the voltage V2, V3 at the terminals of the main transistor T2, T3 decreases to a value substantially equal to zero, and the corresponding diode D2, D3 turns on enabling said main transistor to be turned on under zero voltage.

Once the main transistor T2, T3 has been turned on, this configuration of the transformer TP, TN further enables said transformer to be demagnetized, i.e. there is no longer any current flowing in the transformer windings. This prevents a power build-up in the transformer which would lead to the converter device being destroyed. This demagnetization is made possible by means of the diode DX1, DX4 which enables the output voltage VS to be applied in reverse on the winding 251, 252 when the auxiliary transistor TX2, TX3 is off and when said diode turns on.

The transformer TP, TN generally presents magnetic leaks on each of the windings that can generally not be ignored. An equivalent inductance created by the leaks can thus be defined and this inductance be linked to an equivalent resonance inductance. This resonance inductance determines the slope of the current rise in the transformer windings. Advantageously, the transformer TP, TN comprises an electrically insulating material separating the windings. Choosing the thickness of this insulating material among other things enables the leakage inductance of the transformer and therefore the slope of the current rise to be adjusted.

As can be seen in FIG. 4, a first diode DX1, DX4 is connected between the first winding 251, 252 and the output line 115, 117. When the auxiliary transistor TX2, TX3 is off, this diode enables the current to flow in the first winding 251, 252 in one direction only. This diode also limits the voltage at the terminals of the auxiliary transistor TX2, TX3. A second diode DA1, DA4 is connected between the second winding 253, 254 and the output line 115, 117. This diode enables the current to flow in one direction only in this second winding. The presence of these diodes DA1, DA4 prevents any reversible operation of the switching aid circuits of the converter 211, and enables the transformer TP, TN to be demagnetized. This unidirectional operation is interesting as it limits the operating time of the switching circuit 231, 232, and therefore limits the losses in said circuit.

The main transistors T2, T3 of the switching means can be used in dual thyristor mode, i.e. turn-on takes place in natural manner. In general, main turn-on takes place in natural manner when the switching voltage V2, V3 of the switching means becomes substantially equal to zero and the diode D2, D3 turns on. However, in the case where the intensity of the input current IE on the power supply input 121, 122 is too low, i.e. for an amplitude of the voltage VE of less than about 10% of its maximum value, which generally corresponds to the beginning or the end of a half-wave of said voltage VE, the output voltage does not have time to reach the targeted value of the line voltage VS and natural turn-on of the main transistors is not possible. In this case, the capacitors of the power storage means do not in fact have time to charge and it is difficult to obtain a current resonance entering the inductive means.

Figure 5:
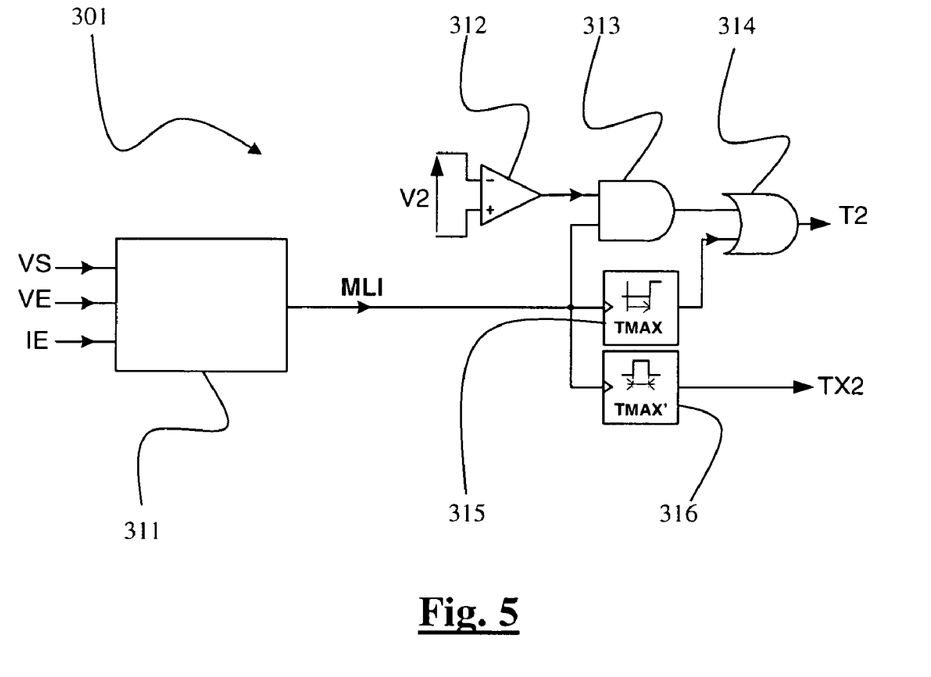
FIG. 5 schematically represents the control means of a converter device.

To remedy this drawback, the control means 301 represented in FIG. 5 comprise a delay module 315 designed to force a delayed main turn-on, after a period longer than a predefined period TMAX. This forced operating mode is mainly implemented at the beginning or the end of a half-wave of the voltage VE, when the value of the input current IE is not sufficient to charge the capacitors of the power storage means. The control means 301 are represented in FIG. 5 for the switching unit 213 only. Equivalent means for the switching unit 216, and the switching units of the other phases, can be used but have not been represented.

More precisely, as represented in FIG. 5, the control means 301 comprise a reference module 311 to generate a first pulse width modulation, PWM, control signal 302. This first control signal is determined from the measurements of the output voltage VS, of the input voltage VE, and of the input current IE. A module 316 performs turn-on of the auxiliary transistor TX2 during a period TMAX'. This period starts from the leading edge of the first control signal 302. In normal operation and during this period TMAX', the auxiliary transistor TX2 can therefore be turned on which enables the voltage V2 to be cancelled to perform turn-on of the main transistor T2. For this, the control means comprise a comparator 312 detecting zero crossing of the voltage V2 at the terminals of the main transistor T2. The output of this comparator is connected to an input of a first logic boolean AND operator referenced 313. Another input of this operator is connected to the output of the module 311 carrying the first pulse width modulation control signal 302. Zero crossing of the voltage V2 and the simultaneous presence of an active pulse width modulation signal thereby activate the output of this boolean operator 313. This output of the operator 313 is connected to a second boolean OR operator referenced 314 the output of which is connected to the control input of the main transistor T2. Thus, in normal operation, when the output of the AND operator 313 is activated, the output of the operator 314 is also activated, which enables turn-on of the main transistor T2 to be commanded at the moment the voltage V2 crosses zero.

In forced operation, i.e. at the beginning or end of a half-wave of the input voltage VE, the value of the input current IE is not sufficient to cancel the voltage V2 at the terminals of the main transistor T2. The output of the AND operator 313 therefore remains inactive. To turn the main transistor T2 on in forced manner, the above-mentioned delay module 315 is therefore used. The output of the module 311 carrying the first control signal 302 is connected to an input of this module 315, the output of this module 315 for its part being connected to an input of the logic OR operator 314. In forced operation, the transistor T2 is therefore automatically turned on at the end of a predefined time TMAX.

The choice of duty cycle used in the modulation module 311 is generally made taking account of the demagnetization time of the transformer TP, TN, which is generally about a half the turn-on time. This prevents saturation of these transformers.

With reference to the timing diagrams of FIGS. 6A to 6M, operation of the switching circuit 213 of the converter device of FIG. 4 is described in the following in the case where the intensity of the input current IE on the power supply input of the converter device is sufficient to obtain natural turn-on of the main transistors. In other words, the operation described hereafter to a certain extent excludes the beginning and end of the half-wave of voltage VE.

Figure 6A:
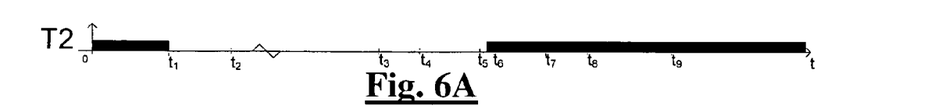
FIGS. 6A to 6M are timing diagrams illustrating operation of the converter device represented in FIG. 4 during most of the half-wave.
Figure 6B:
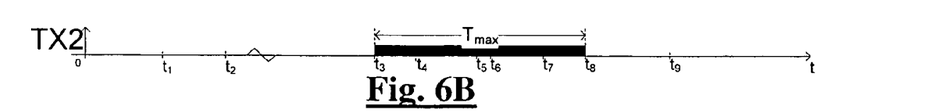
Figure 6C:
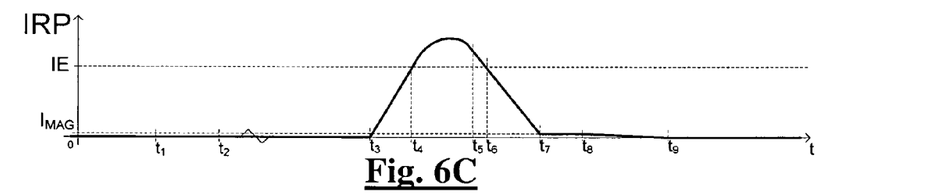
Figure 6D:
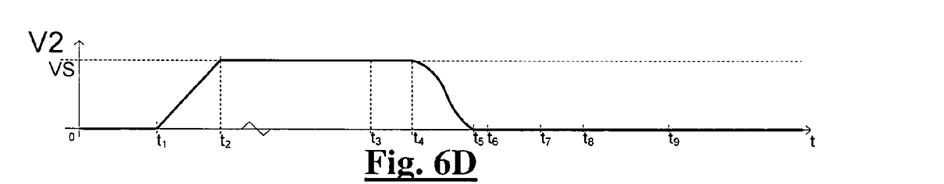
Figure 6E:
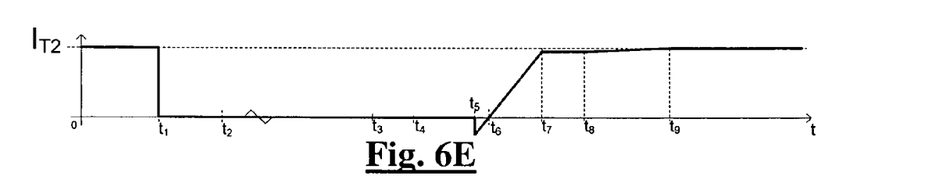
Figure 6F:
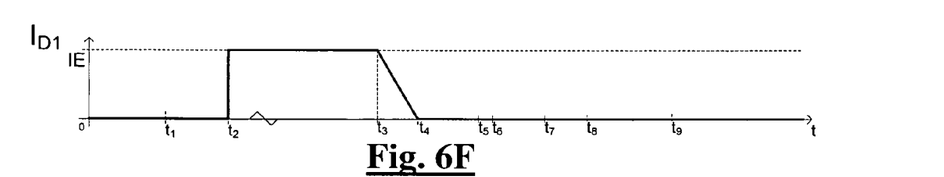
Figure 6G:
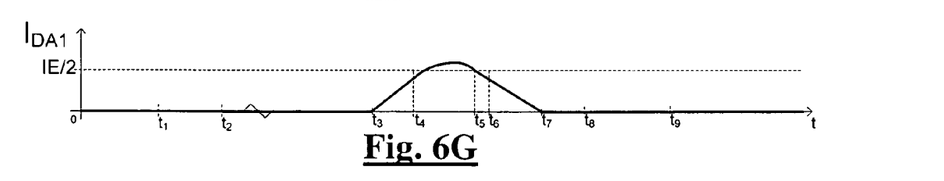
Figure 6H:
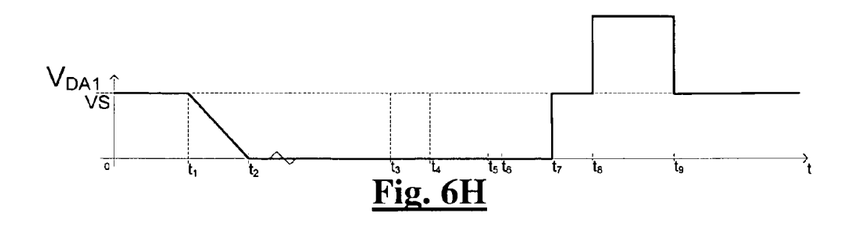

At the outset the main transistor T2 is in an on or conducting state, which is indicated by the presence of a bold line in FIG. 6A. The auxiliary transistor TX2 is for its part in an off state which is indicated by the absence of a bold line in FIG. 6B. As can be seen in FIG. 6F, the diode D1 is off. The transistor T2 sees a current IT2 flow, represented in FIG. 6E, that is substantially equal to the input current IE. The voltage V2 at the terminals of the transistor T2 represented in FIG. 6D is therefore substantially equal to zero. The diode DA1 does not see any current flow as represented in FIG. 6G and is in off state. The voltage VDA1 at its terminals represented in FIG. 6H is therefore substantially equal to the value of the output voltage VS on the output line 115.

Figure 6I:
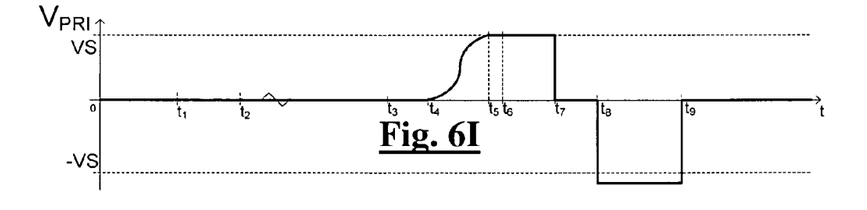
Figure 6J:
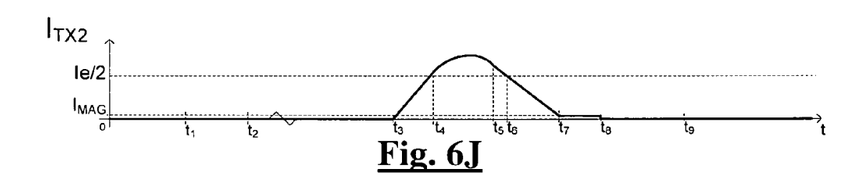
Figure 6K:
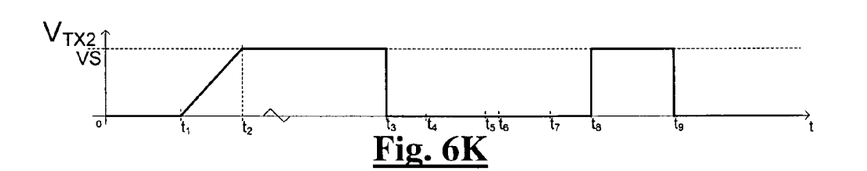

At time t1, the transistor T2 is off (FIG. 6A), and the input current IE is branched off into the storage means 137 which enables the losses of said transistor to be reduced. As can be seen in FIG. 6D, the voltage V2 at the terminals of main transistor T2 starts to increase progressively, charging the parallel-connected capacitor CR2. The diode DA1 is still in the off state, and the voltage VDA1 at these terminals starts to decrease (FIG. 6H) until it reaches a zero value. At the same time, as can be seen in FIG. 6K, the voltage VTX2 at the terminals of the auxiliary transistor TX2 increases until it reaches the value of the output voltage VS.

At time t2, the voltage V2 at the terminals of the main transistor T2 reaches the value of the output voltage VS (FIG. 6D), and the diode D1 starts conducting a current ID1 the value of which is substantially equal to the value of the input current IE represented in FIG. 6F.

At time t3, the auxiliary transistor TX2 is turned on (FIG. 6B), which will lead to a decrease of the current ID1 in the diode D1 (FIG. 6F) which is branched off to said auxiliary transistor TX2 which has turned on. As can be seen in FIG. 6J, the auxiliary transistor TX2 therefore sees a current ITX2 which increases progressively. The current IRP input to the transformer TP, represented in FIG. 6C, will therefore increase at the same time as the current ID1 decreases. After turn-on of the diode DA1, this current IRP results from the sum of the current ITX2 in the first winding 251 of the transformer TP (FIG. 6J) and of the current IDA1 in the second winding 253 of this same transformer TP (FIG. 6G). As soon as the diode DA1 is turned on, the output voltage VS is applied to the two windings 251, 253 of the transformer TP. On account of the magnetic leaks of this transformer, the winding 251 will be subjected to a voltage VSEC at its terminals, represented in FIG. 6M, substantially equal to the output voltage VS. The transformation ratio of the transformer TP being very close to one, the current ITX2 in the winding 251 represented in FIG. 6J and the current IDA1 in the winding 253 represented in FIG. 6G are substantially equal to a half of the value of the current IRP input to the transformer TP, i.e. equal to a half of the input current IE.

At time t4, there is no longer any current flowing in the diode D1, which leads to turn-off of the latter (FIG. 6F). The voltage V2 at the terminals of the transistor T2 (FIG. 6D) therefore starts to decrease. At the same time, as can be seen in FIGS. 6C, 6G, and 6J, the current IRP on the input of the transformer TP and the currents IDA1 and ITX2 in each winding will continue to increase by mutual induction. In this way, the current IRP input to the transformer will enter into resonance. At time t4, the capacitor CR1 which is discharged will in fact charge progressively as the voltage V2 at the terminals of the main transistor T2 decreases to zero. At the same time, the capacitor CR2 which is initially charged will start to discharge.

Between time t4 and t5, when the voltage V2 at the terminals of the main transistor T2 is substantially equal to half the output voltage VS, the current IRP input to the transformer TP will reach a resonance peak (FIGS. 6C and 6D). During this lapse of time, the voltage VSEC at the terminals of the winding 251 of the transformer TP will decrease (FIG. 6M) and the voltage VPRI at the terminals of the winding 253 of this same transformer will increase (FIG. 6I). In other words, the output voltage VS will simultaneously switch from the winding 251 to the winding 253.

At time t5, whereas the voltage V2 at the terminals of the main transistor T2 is cancelled (FIG. 6D), a weak current will flow in the reverse-connected diode D2 parallel to the transistor T2. This can be seen in FIG. 6E representing the current IT2 flowing in the module constituted by the main transistor T2 and diode D2. The main transistor T2 is turned on between time t5 and time t6, with a voltage V2 at these terminals that is therefore substantially equal to zero (FIG. 6D). The power dissipated when this turn-on takes place is thereby minimized.

At time t6, the current IT2 in the main transistor T2 increases progressively (FIG. 6E) and the intensity of currents ITX2 and IDA1 respectively in the first and second winding 251, 253 decrease at the same time (FIGS. 6J, 6G).

At time t7, there is no longer any current flowing in the diode DA1 and in the second winding 253 of the transformer TP (FIG. 6G), which results in turn-off of said diode. A current of weak intensity IMAG represented in FIG. 6J, due to the magnetization of transformer TP, continues to flow in the transistor TX2 and in the first winding of said transformer. Between time t7 and time t8, the voltages VPRI, VSEC at the terminals of the windings 253, 251 of the transformer TP being substantially equal to zero (FIGS. 6I, 6M), the value of this current IMAG remains substantially constant.

Figure 6L:
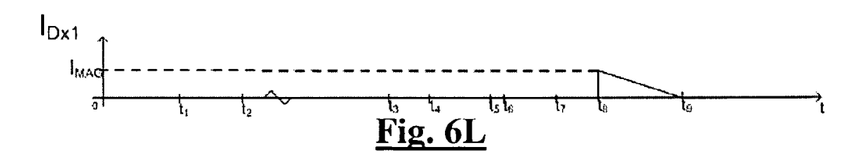
Figure 6M:
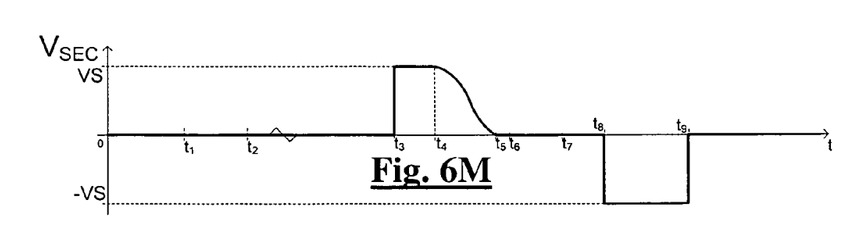

At time t8, the transistor TX2 is commanded to an off state (FIG. 6B) and the diode DX1 enables the magnetization current IMAG flowing in the first winding 251 to be completely removed, as represented in FIG. 6L. Complete demagnetization of the transformer TP thus takes place before main turn-off of the main transistor T2. As can be seen in FIG. 6K, the value of the voltage at the terminals of the transistor TX2 is substantially equal to the output voltage VS. As can be seen in FIG. 6H, the voltage at the terminals of the diode DA1 is for its part substantially equal to twice the value of the output voltage VS. Thus, during demagnetization of the transformer TP, the voltage VTX2 at the terminals of the auxiliary transistor TX2 is twice lower than the voltage VDA1 at the terminals of the diode DA1. It is therefore the diode DA1 which absorbs a high demagnetization voltage instead of the auxiliary transistor TX2, which enables a transistor TX2 of lower rating to be chosen, which is therefore less expensive and which operates with a lower power consumption.

At time t9, the transformer TP is completely demagnetized, i.e. the mean value of the voltage at its terminals is zero. The current IMAG therefore becomes zero and the diode DX1 turns off (FIG. 6L). We thereby revert to the initial situation preceding time t1.

With reference to FIGS. 7A to 7K, operation of the switching circuit 213 of the converter device of FIG. 4 is described in the following in the particular case where the intensity of the input current IE on the power supply input is insufficient to obtain natural turn-on of the main transistors. The operation described hereafter is therefore generally applicable to the beginning and end of the half-wave of the voltage VE.

Figure 7A:
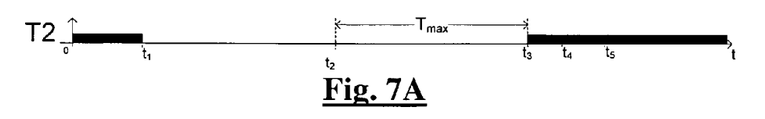
FIGS. 7A to 7K are timing diagrams illustrating operation of the converter device represented in FIG. 4 at the beginning and end of a half-wave.
Figure 7B:
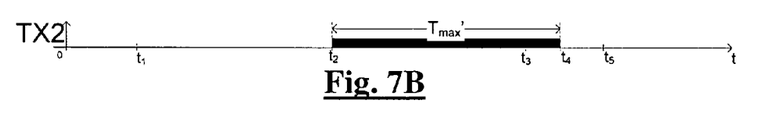
Figure 7C:
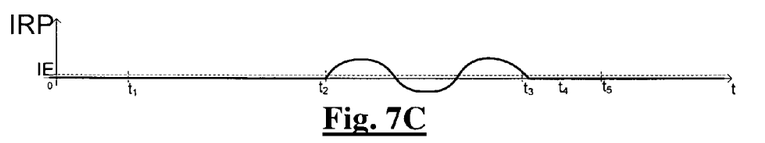
Figure 7D:
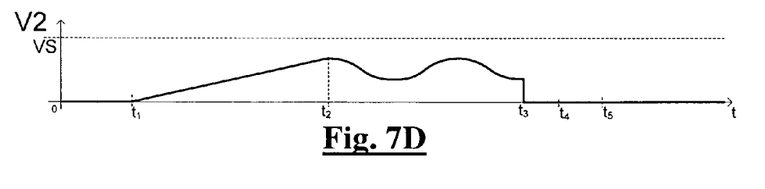
Figure 7E:
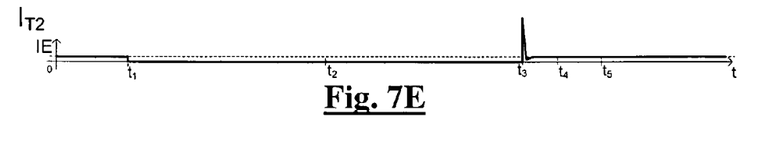
Figure 7F:
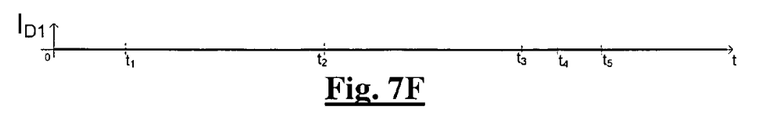

At the outset, the transistor T2 is on or conducting, as can be seen in FIG. 7A, and conducts a current IT2 represented in FIG. 7E the value of which is substantially equal to the input current IE. As can be seen in FIGS. 7D and 7F, the value of the voltage V2 at the terminals of the main transistor T2 is almost zero and the diode D1 is in the off state.

At time t1, the main transistor T2 switches from on state to off state (FIG. 7A) and the input current IE is branched off to the storage means 137. As can be seen in FIG. 7D, the voltage V2 at the terminals of the main transistor T2 starts to increase progressively, charging the parallel-connected capacitor CR2. The intensity of the input current IE being too low, the voltage V2 at the terminals of the transistor T2 increases very slowly and does not manage to reach the value of the output voltage VS. The diode D1 can therefore not be turned on and therefore does not conduct (FIG. 7F).

Figure 7G:
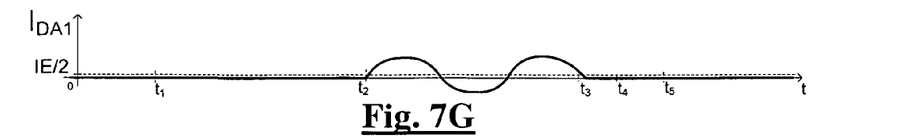
Figure 7H:
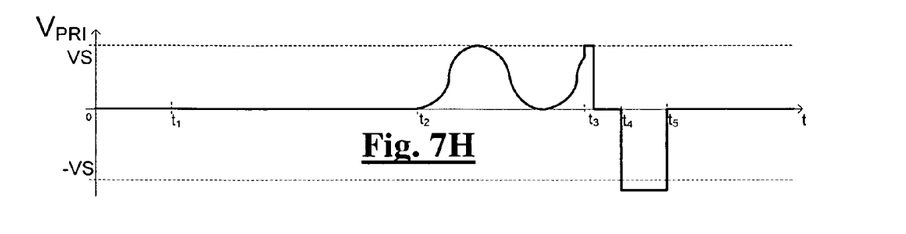
Figure 7I:
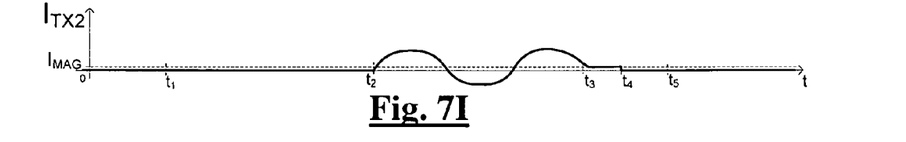

At time t2, the auxiliary transistor TX2 is turned on (FIG. 7B). As can be seen in FIG. 7I, the auxiliary transistor TX2 therefore sees a current ITX2 which increases progressively. In the same way, the current IRP input to the transformer TP (FIG. 7C) and the current IDA1 in the diode DA1 (FIG. 7G) increase.

The current IRP input to the transformer TP will then enter a resonance phase. The capacitor CR1 which is initially discharged will in fact charge progressively as the voltage V2 at the terminals of the main transistor T2 drops to zero. At the same time, the capacitor CR2 which is initially charged will start to discharge. The current IRP input to the transformer TP will then reach a resonance peak (FIG. 7C) which will be followed by a decrease. As can be seen in FIGS. 7C, 7D, 7G, 7H, 7I and 7K, the resonance phase results in oscillations without the voltage V2 at the terminals of the main transistor T2 being able to be cancelled. The transistor T2 can therefore not turn on due to the fact that the output of the logic boolean AND operator 313 of the control means 301 remains in an inactive state.

At time t3, after the lapse of time TMAX defined by the delay module 316 of the control means 301, the main transistor T2 is turned on automatically (FIG. 7A). At the same time, the voltage V2 at the terminals of the main transistor T2 is abruptly decreased towards zero (FIG. 7D) which generates a current peak in the main transistor T2 (FIG. 7E). The current IRP decreases (FIG. 7C) and the diode DA1 is in the off state (FIG. 7G). Only a magnetizing current IMAG flows in the transistor TX2 (FIG. 7I).

Figure 7J:
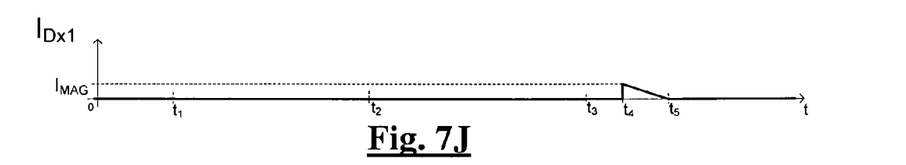
Figure 7K:
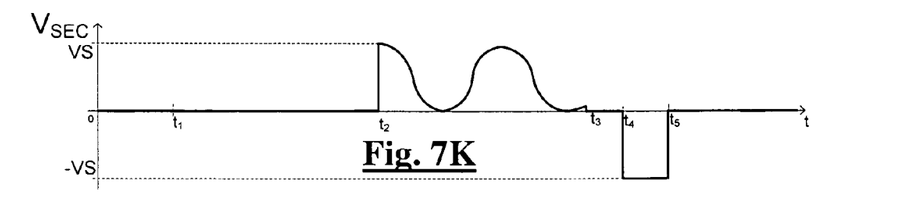

At time t4, after a period TMAX' defined by the module 315 of the control means 301, the auxiliary transistor TX2 is off (FIG. 7B). The diode DX1 enables complete demagnetization of the transformer TP to be obtained at time t5 (FIGS. 7H, 7I and 7J).

At time t5, the transformer TP is completely demagnetized. The current IMAG therefore becomes zero and the diode DX1 turns off (FIG. 7J). We then revert back to the initial situation preceding time t1.

The converter device represented in FIG. 4 the operation of which has been described in the foregoing corresponds to an assembly of step-up chopper type. The converter device according to the invention can also be adapted to an assembly of step-down chopper type, as in the embodiment represented in FIG. 8.

Figure 8:
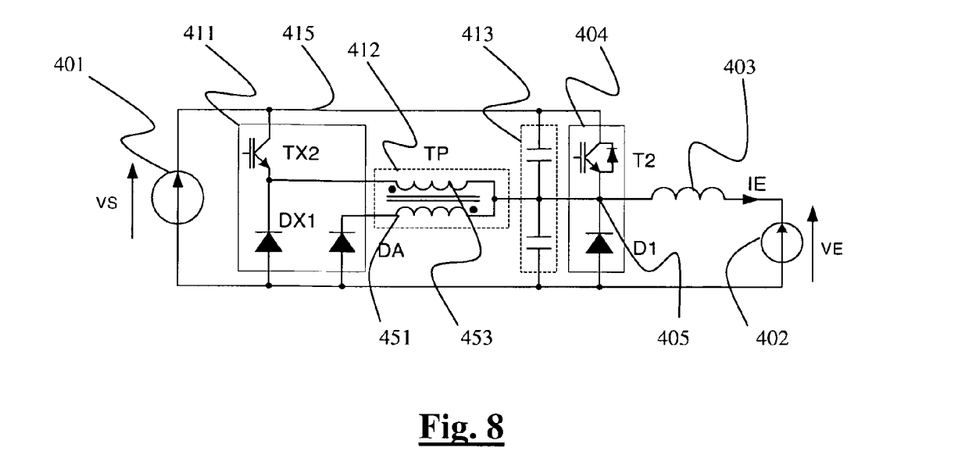
FIG. 8 partially represents a step-down device according to a second embodiment of the invention.

The converter device represented partially in FIG. 8 comprises elements already described in the foregoing with reference to FIG. 4. For the sake of simplification, only the switching circuit for processing the positive half-waves associated with one of the three phases has been represented. The converter device represented in FIG. 8 comprises a voltage source 402 delivering an AC input voltage VE and an input current IE, and switching means 404. The switching circuit represented enables a substantially constant voltage VS having a positive value to be supplied on the output line 415. The output of the circuit converter is represented as a DC voltage source VS. An inductance 403 serves the purpose of matching the impedance between the two voltage sources. The switching circuit represented comprises a power supply input 405 on which the input voltage VE is applied and to which the input current IE is input. The rectifier means D1 and main transistor T2 form a step-down structure. The converter device is equipped with a switching aid circuit arranged between the power supply input 405 and the output line 415 comprising inductive means 412 essentially formed by a transformer TP directly connected to the power supply input 405. The switching aid circuit also comprises input current branch-off means 411, i.e. an auxiliary transistor TX2 connected to the transformer TP, TN to establish branch-off of the input current IE to said transformer before main turn-on. More precisely, the auxiliary transistor TX2 is connected between the first winding 451 and the output line 415. The switching aid circuit further comprises power storage means 413 connected in parallel on the switching means 404.

As represented in FIG. 8, the transformer TP comprises a first winding 451 connected between the power supply input 405 and the branch-off means TX2, and a second reverse-coiled winding 453 magnetically coupled to the first winding and connected between said power supply input 405 and the output line and a voltage reference. A first reverse-blocking diode DX1 is connected between the first winding 451 and the voltage reference. A second reverse-blocking diode DA1 is connected between the second winding 453 and the voltage reference. Operation of this step-down assembly is essentially the same as that of the step-up assembly described in the foregoing.

Figure 9:
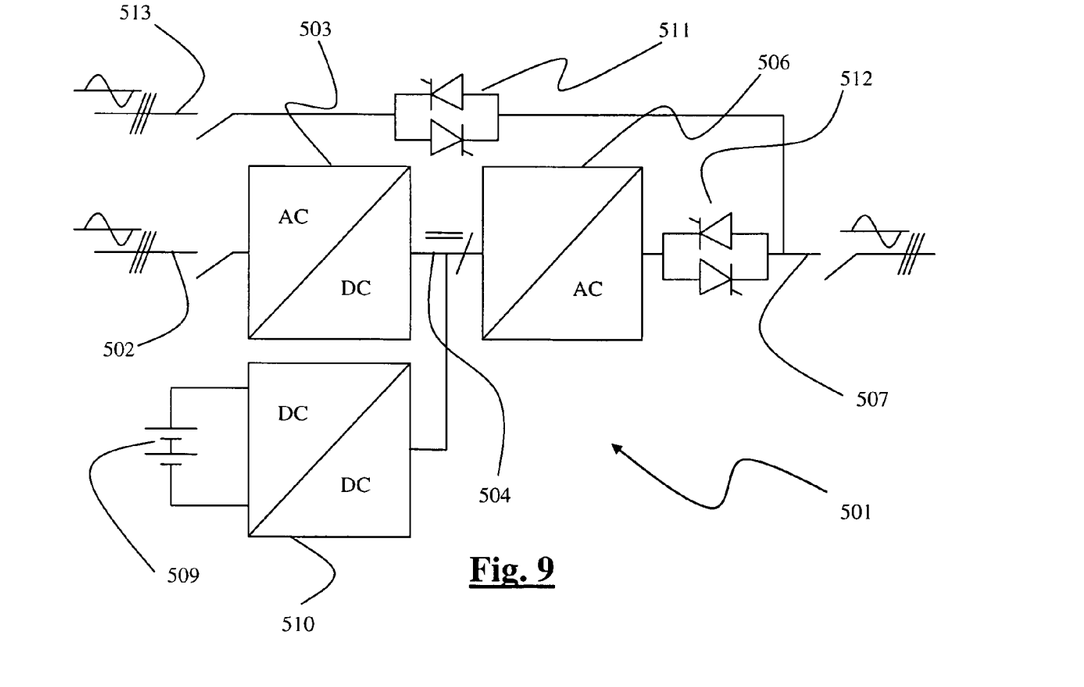
FIG. 9 represents an uninterruptible power supply according to the invention.

The converter devices described in the foregoing, and in particular the rectifier devices, can be used in an uninterruptible power supply 501 such as the one represented in FIG. 9. This uninterruptible power supply comprises a power supply input 502 on which a variable input voltage from a first three-phase power system is applied. The uninterruptible power supply comprises a rectifier 503 of the previously described type, said rectifier being connected between on the one hand the power supply input 502 and on the other hand two output lines 504 or substantially DC voltage busses. The uninterruptible power supply comprises an inverter 506 connected between the output lines 504 and an output 507 designed to supply a secured three-phase AC voltage to a load 508. The DC voltage bus 504 is also connected to a battery 509 via a DC/DC converter 510.

As can be seen in FIG. 9, static switches 511 and 512 enable selection between the power supply input 502 of the first three-phase power system and a power supply input 513 of a second power system which is also three-phase. It is thereby possible to supply the load via the first secured power system by the uninterruptible power supply 501, and then to switch onto the second power system if required.

The invention claimed is:

1. A unidirectional converter device for supplying a DC output voltage on an output line, said device including at least one switching unit comprising:
a power supply input to which an input voltage is applied,
rectifier means connected to said power supply input for supplying the output voltage,
switching means connected to said power supply input for a main turn-on or turn-off of an input current so that, when main turn-off occurs, an input current is diverted to said rectifier means,
control means for said switching means,
a switching aid circuit connected between the power supply input and the output line for establishing a switching voltage equal to zero before main turn-on, said switching aid circuit comprising inductive means and branch-off means branching off of the input current to said inductive means before main turn-on, and
power storage means parallel-connected on the switching means for establishing a resonance of said current in the inductive means before main turn-on,
wherein said inductive means comprise a transformer directly connected to the power supply input, and comprising at least one first winding, at least one second winding reverse-coiled with respect to the first winding, and the branch-off means comprise auxiliary switching means directly connected either between said inductive means and a voltage reference or between said inductive means and the output line.

2. The device according to claim 1, wherein the first winding is connected between the power supply input and the branch-off means, and the second winding is magnetically coupled to the first winding and connected between said power supply input and the output line or between the power supply input and the voltage reference.

3. The device according to claim 1, wherein the transformer presents a transformation ratio of less than one.

4. The device according to claim 2, wherein a first reverse-blocking diode is connected between the first winding and the output line or between the first winding and the voltage reference.

5. The device according to claim 4, wherein a second reverse-blocking diode is connected between the second winding and the output line or between the second winding and a voltage reference.

6. The device according to claim 2, wherein the auxiliary switching means comprise an auxiliary transistor directly connected between the first winding and the voltage reference or between the first winding and the output line, said auxiliary transistor for supplying to the transformer windings a voltage having a value that is a function of the output voltage on main turn-off and at the moment turn-on of said auxiliary transistor takes place.

7. The device according to claim 1, wherein the control means comprise a delay module for forcing a delayed main turn-on after a longer period than a predefined period.

8. The device according to claim 7, wherein the control means are connected to the auxiliary switching means and comprise a module for triggering current branch-off during a longer period than the predefined period.

9. The device accord according to claim 1, wherein the rectifier means comprise a diode for a current input to the power supply input.

10. The device according to claim 1, wherein the power storage means comprise a first capacitor parallel-connected with the rectifier means and a second capacitor parallel-connected with the switching means.

11. An uninterruptible power supply comprising a power supply input to which a variable input voltage can be applied, a rectifier connected to said input, at least one DC voltage line connected to an output of the rectifier, an inverter connected to a voltage line and comprising an output for supplying a variable output voltage, wherein the rectifier is a converter device according to claim 1 for supplying DC output voltage on said line.

* * * * *